(12) United States Patent
Takahashi (10) Patent No.: US 8,411,224 B2
(45) Date of Patent: Apr. 2, 2013

(54) DISPLAY APPARATUS WITH PROTECTION PLATE AND MANUFACTURING METHOD THEREOF

(75) Inventor: Masayuki Takahashi, Asaka (JP)

(73) Assignee: Casio Computer Co., Ltd., Tokyo (JP)

( * ) Notice: Subject to any disclaimer, the term of this patent is extended or adjusted under 35 U.S.C. 154(b) by 327 days.

(21) Appl. No.: 12/830,549

(22) Filed: Jul. 6, 2010

(65) Prior Publication Data

US 2011/0007391 A1  Jan. 13, 2011

(30) Foreign Application Priority Data

Jul. 8, 2009  (JP) ................................ 2009-161408

(51) Int. Cl.
*G02F 1/1333* (2006.01)
(52) U.S. Cl. ......................................................... 349/58
(58) Field of Classification Search .................. None
See application file for complete search history.

(56) References Cited

U.S. PATENT DOCUMENTS

| | | | |
|---|---|---|---|
| 8,087,967 B2 * | 1/2012 | Shinya et al. | 445/58 |
| 2007/0046873 A1 | 3/2007 | Sakurai et al. | |
| 2008/0100783 A1 | 5/2008 | Bae | |
| 2009/0086123 A1 * | 4/2009 | Tsuji et al. | 349/58 |
| 2009/0185100 A1 | 7/2009 | Matsuhira et al. | |
| 2010/0245707 A1 * | 9/2010 | Harada | 349/58 |
| 2011/0012852 A1 | 1/2011 | Takahashi | |
| 2011/0043733 A1 | 2/2011 | Suzuki et al. | |
| 2011/0141409 A1 | 6/2011 | Ashida | |

FOREIGN PATENT DOCUMENTS

| | | |
|---|---|---|
| JP | 5-339544 A | 12/1993 |
| JP | 11-174435 A | 7/1999 |
| JP | 2001-075494 A | 3/2001 |
| JP | 2005-099305 A | 4/2005 |
| JP | 2006-078929 A | 3/2006 |
| JP | 2007-093684 A | 4/2007 |
| JP | 2008-090053 A | 4/2008 |
| JP | 2009-122655 A | 6/2009 |

OTHER PUBLICATIONS

U.S. Appl. No. 12/833,015; First Named Inventor: Masayuki Takahashi; Title: "Protection-Plate-Attached Electronic Member"; filed Jul. 9, 2010.
Japanese Office Action dated Apr. 12, 2011 (and English translation thereof) in counterpart Japanese Application No. 2009-161408.

* cited by examiner

*Primary Examiner* — Sung Pak
(74) *Attorney, Agent, or Firm* — Holtz, Holtz, Goodman & Chick, P.C.

(57) ABSTRACT

Disclosed is a display apparatus with a protection plate including a display panel including a first transparent substrate, an adhesion layer arranged so as to overlap with an entire screen area of the display panel, the protection plate fixed to the display panel by the adhesion layer in a state where the adhesion layer intervening between the protection plate and the first transparent substrate and a cured bonding layer which directly contacts the display panel and the protection plate and which is provided on a circumference of the adhesion layer, and at least one aperture making a region in one side on which the screen area of the display panel is arranged with respect to the bonding layer and a region in the other side opposite to the one side with respect to the bonding layer communicate with each other is provided in the bonding layer.

2 Claims, 5 Drawing Sheets

DISPLAY APPARATUS WITH PROTECTION PLATE AND MANUFACTURING METHOD THEREOF

CROSS-REFERENCE TO RELATED APPLICATIONS

This application is based upon and claims the benefit of priority under 35 USC 119 of Japanese Patent Application NO. 2009-161408 filed on Jul. 8, 2009, the entire disclosure of which, including the description, claims, drawings, and abstracts, is incorporated herein by reference in its entirety.

BACKGROUND OF THE INVENTION

1. Field of the Invention

The present invention relates to a display apparatus with protection plate and a manufacturing method thereof.

2. Description of the Related Art

For example, as described in JP 2008-90053, a display apparatus with protection plate in which the protection plate is arranged on the front surface side of the display panel and the two are pasted together for protecting the display panel is conventionally known (see, for example, JP 2008-90053). It is necessary for such a display apparatus with protection plate that the protection plate and the display panel are firmly fixed to each other so that the protection plate and the display panel will not be easily separated from each other at the time of use. Accordingly, an adhesive that is cured after being pasted (for example, a UV curable resin and a heat curable resin) is used for firmly fixing the front panel and the protection plate to each other so that they will not be easily separated from each other.

At the time of manufacturing a display panel with protection plate, when an alien substance, an air bubble, or the like enters a screen area between the display panel and the protection plate after pasting them together, the display panel is judged as an inferior product. In this case, if the joining strength between the display panel and the protection plate with the adhesive put between them is too large, it is impossible to tear off the two, and it is the actual circumstances that the display panel and the protection plate are obliged to be abandoned after all.

BRIEF SUMMARY OF THE INVENTION

A display apparatus with a protection plate of the present invention comprises a display panel including a first transparent substrate, an adhesion layer arranged so as to overlap with an entire screen area of the display panel, the protection plate fixed to the display panel by the adhesion layer in a state where the adhesion layer intervening between the protection plate and the first transparent substrate and a cured bonding layer which directly contacts the display panel and the protection plate and which is provided on a circumference of the adhesion layer, and at least one aperture making a region in one side on which the screen area of the display panel is arranged with respect to the bonding layer and a region in the other side opposite to the one side with respect to the bonding layer communicate with each other is provided in the bonding layer.

A manufacturing method of a display apparatus with a protection plate of the present invention comprises preparing a display panel having a transparent substrate and a protection plate which is fixed to the display panel, forming an adhesion layer for pasting the display panel and the protection plate together so as to superpose the adhesion layer on an entire screen area of the display panel, the adhesion layer being formed on either a surface of the display panel on a side arranged to be opposed to the protection plate or a surface of the protection plate on a side arranged to be opposed to the display panel, pasting the display panel and the protection plate together with the adhesion layer intervening therebetween, forming a bonding layer by making an uncured bonding layer directly contact each of both of the display panel and the protection plate so as to form an aperture at a circumference of the adhesion layer to enable a region on one side of on which the screen area of the display panel is arranged with respect to an outer periphery of the adhesion layer and a region on the other side opposite to the one side with respect to the outer periphery of the adhesion layer to communicate with each other and fixing the display panel and the protection plate to each other by curing the uncured bonding layer.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are explanatory diagrams showing a preparation process in the manufacturing method of the display apparatus with protection plate of the embodiment where

FIGS. 4A and 4B are explanatory diagrams showing an adhesion layer arranging process in the manufacturing method of the display apparatus with protection plate of the embodiment where

FIGS. 5A and 5B are explanatory diagrams showing a pasting process of the manufacturing method of the display apparatus with protection plate of the embodiment where

FIGS. 6A and 6B are explanatory diagrams showing a bonding layer arranging process in the manufacturing method of the display apparatus with protection plate of the embodiment where

DETAILED DESCRIPTION OF THE INVENTION

Embodiments of the present invention will be explained with reference to the drawings.

Hereinafter, the best mode for carrying out the present invention will be described by using the drawings. Although technically preferable various limitations in order to implement the present invention are, however, attached to the embodiment described below, scope of the invention is not limited to the following embodiment and shown examples.

Figure 1:
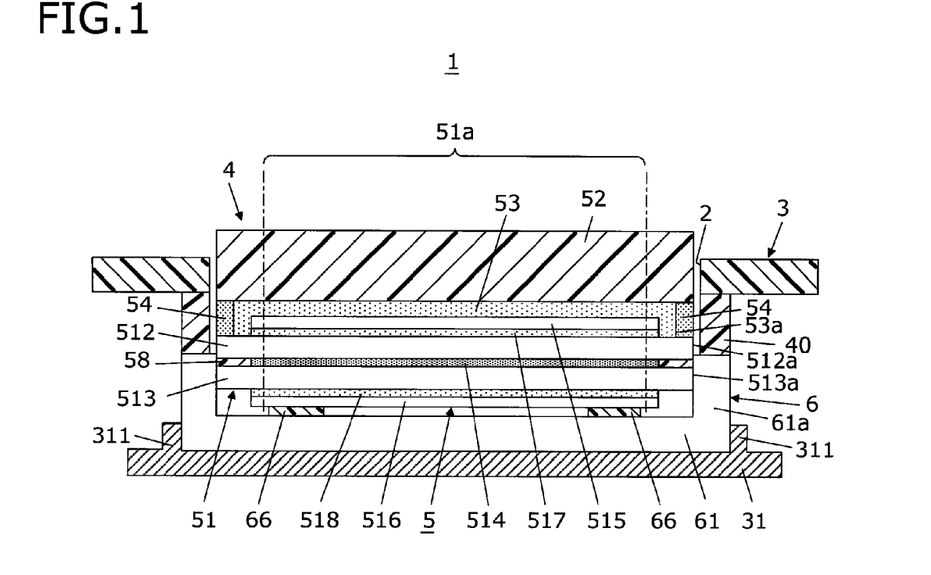
FIG. 1 is a sectional view showing a schematic configuration of an electronic device mounting a display apparatus with protection plate of the embodiment.

FIG. 1 is a sectional view showing the schematic configuration of an electronic device mounting a display apparatus with protection plate. The electronic device 1 is a cellular phone, a digital camera, an electronic organizer or the like. As shown in FIG. 1, the electronic device 1 includes a case 3 having a displaying opening 2 of a predetermined size and a liquid crystal display module 4 which is housed in the case 3 so as to correspond to the opening 2.

The liquid crystal display module 4 includes a display apparatus 5 with protection plate and a surface light source unit 6 as a surface light source to irradiate an irradiation light to the display apparatus 5 with protection plate. Hereinafter, regarding a pair of transparent substrates 512 and 513 of the display apparatus 5 with protection plate, the side on which the surface light source unit 6 is arranged (the lower side in FIG. 1) is called "back surface side" and the opposite side (the upper side in FIG. 1) of the back surface side is called "observation side."

Hereinafter, the display apparatus 5 with protection plate will be described in detail. As shown in FIG. 1, the display apparatus 5 with protection plate includes a liquid crystal display panel 51 as a display panel for displaying an image, an adhesion layer 53 which is superposed over the entire screen area 51a of the liquid crystal display panel 51 and a protection plate 52 which is arranged on the surface of the liquid crystal display panel 51 on the observation side by the adhesion layer 53.

The liquid crystal display panel 51 includes the pair of transparent substrates 512 and 513 of the observation side and the back surface side, respectively, which are oppositely arranged by having a predetermined gap therebetween, a liquid crystal layer 514 which is encapsulated in the gap between the transparent substrates 512 and 513, a first and a second transparent electrodes (omitted from the drawing) which are provided at the inner surfaces of the pair of transparent substrates 512 and 513 facing each other, respectively, for forming a plurality of pixels for controlling the transmission of the light by changing the orientation state of the liquid crystal molecules of the liquid crystal layer 514 by applying voltages, an optical sheet 515 which is pasted on the outer surface of the transparent substrate (the second transparent substrate) 512 of the observation side with an adhesive compound 517 for an optical sheet and a polarizing plate 516 which is pasted on the outer surface of the transparent substrate (the first transparent substrate) 513 of the back surface side with an adhesive compound 518 for a polarizing plate.

This liquid crystal display panel 51 is an active matrix liquid crystal element using thin film transistors (TFTs) as active elements. Although they are omitted in the drawings, the inner surface of one transparent substance (for example, the transparent substrate 513 of the back surface side) of the pair of transparent substrates 512 and 513 is provided with a plurality of pixel electrodes (the first electrodes) which are formed so as to be arranged in a matrix in row directions and column directions, a plurality of TFTs which are arranged so as to respectively correspond to the plurality of pixel electrodes to be connected to the corresponding pixel electrodes, a plurality of scanning lines each of which supplies a gate signal to the plurality of TFTs in each row and a plurality of signal lines each of which supplies a data signal to the plurality of TFTs in each column. On the other hand, the inner surface of the other transparent substrate (for example, the transparent substrate 512 of the observation side) is provided with a counter electrode (the second electrode) which is formed so as to be opposed to the entire arrangement region of the plurality of pixel electrodes and color filters of three colors of red, green and blue each of which are formed so as to correspond to each of a plurality of pixels formed of regions in which the plurality of pixel electrodes and the counter electrode face each other.

Then, the pair of transparent substrates 512 and 513 is joined together with a frame-shaped seal material 58 which encloses the screen area 51a in which the plurality of pixels is arranged in a matrix, and the liquid crystal layer 514 is encapsulated in the region enclosed by the seal material 58 in the gap of these transparent substrates 512 and 513. Furthermore, an orientation film (omitted from the drawing) covering the electrode is formed on each of the inner surfaces of the pair of transparent substrates 512 and 513, and the liquid crystal molecules of the liquid crystal layer 514 are held to be oriented in the initial orientation state by the orientation films.

Here, the liquid crystal display panel 51 may be any of a twisted nematic (TN) type or a super twisted nematic (STN) type liquid crystal display panel in which liquid crystal molecules are oriented so as to be twisted between the pair of transparent substrates 512 and 513, a perpendicular orientation type liquid crystal display panel in which liquid crystal molecules are oriented substantially perpendicular to the transparent substrates 512 and 513, a non-twisted horizontal orientation type liquid crystal display panel in which liquid crystal molecules are arranged in one direction to be oriented so as to be substantially parallel to the inner surfaces of the transparent substrates 512 and 513, a bend orientation type liquid crystal display panel in which liquid crystal molecules are bend-oriented and the like. Further, the liquid crystal display panel 51 may be a ferroelectric or an anti-ferroelectric liquid crystal display panel.

Moreover, the liquid crystal display panel 51 is provided with the plurality of pixel electrodes on the inner surface of the transparent substrate 513 of the back surface side and is provided with the counter electrode on the inner surface of the transparent substrate 512 of the observation side. However, in addition to this type of liquid crystal display panel, for example, a lateral field control type may be adopted as the liquid crystal display panel. The lateral field control type liquid crystal display panel is provided with a plurality of first electrodes for forming a plurality of pixels arranged in a matrix on the inner surface of one of the pair of transparent substrates 512 and 513, a second electrode including a plurality of elongated electrode parts formed by being insulated from the first electrodes more in the side of the liquid crystal layer 514 or in the side of the one transparent substrate than the first electrodes, a plurality of TFTs which are arranged so as to correspond to the plurality of first electrodes, respectively, to be connected to the corresponding first electrodes, a plurality of scanning lines each of which supplies a gate signal to a plurality of TFTs in each row and a plurality of signal lines each of which supplies a data signal to a plurality of TFTs in each column. The lateral field control type liquid crystal display panel thereby generates lateral electric fields (electric fields in the direction along substrate surfaces) between the plurality of first electrodes and the second electrode to change the orientation states of liquid crystal molecules.

Further, the optical sheet 515 is composed of a polarizing plate (hereinafter referred to as an observation side polarizing plate) with a polarizing layer put between protection films, and a phase plate laminated on the surface opposing the transparent substrate 512 of the observation side of the observation side polarizing plate in order to improve the view angle characteristic and the like of the liquid crystal display panel 51. The optical sheet 515 is formed in a substantial rectangle shape which is smaller than the external form of the transparent substrate 512 of the observation side and larger than the screen area 51a, and is pasted in a region except for the periphery of the transparent substrate 512 in order not to overlap with the periphery. On the other hand, the polarizing plate 516 is formed in the substantially same shape as that of the optical sheet 515, and is pasted in a region on the transparent substrate 513 of the back surface side except for the periphery of the transparent substrate 513.

The protection plate 52 is made of tempered glass or a transparent resin plate having high strength. As for the transparent resin having high strength, for example, an acrylic resin, polycarbonate, and the like can be named. Further, the protection plate 52 is formed in a size to cover the entire transparent substrate 512 of the observation side of the liquid crystal display panel 51. In particular, the protection plate 52 is formed in the size of being larger than the external form of the transparent substrate 512 of the observation side in the liquid crystal display panel 51, and is arranged to be opposed to the outer surface of the optical sheet 515 (the surface in the observation side of the outer surfaces of the polarizing plate) and the outer surface of the periphery exposed from the optical sheet 515 of the transparent substrate 512.

The adhesion layer 53 is made of, for example, an adhesive compound such as slightly adhesive silicon and a fluorine compound, and is formed in a rectangle shape. The adhesive compound is a soft solid in gel form having adhesion at the time of pasting, and the adhesive compound keeps the adhesion after pasting. The adhesion layer 53 is arranged on the surface in the observation side of the liquid crystal display panel 51 to intervene between the liquid crystal display panel 51 and the protection plate 52. In particular, the adhesion layer 53 covers the outer surface of the optical sheet 515 and a part of the outer surface of the periphery of the transparent substrate 512 where is exposed from the optical sheet 515. Hereby, the periphery of the adhesion layer 53 is arranged between the transparent substrate 512 of the observation side and the protection plate 52 to directly contact the two. Further, a step is formed between the side surface 53a of the adhesion layer 53 and the side surfaces 512a and 513a of the transparent substrates 512 and 513, respectively, so that the side surface 53a of the adhesion layer 53 is more inside.

A bonding layer 54 which directly contacts the liquid crystal display panel 51 and the protection plate 52 is filled in the region formed by the step, that is, the region (bonding layer filling region) between the transparent substrate 512 and the protection plate 52 and outside of the adhesion layer 53. The bonding layer 54 may be formed with a UV curable resin, a heat curable resin or a naturally curable resin. The bonding layer 54 encloses the circumference of the adhesion layer 53, and four aperture portions 541 enabling the region in the side in which the screen area 51a of the liquid crystal display panel 51 is arranged with respect to the bonding layer 54 to communicate with the opposite side region are formed in parts of the bonding layer 54 (see FIG. 6B). Because the bonding layer 54 is divided by the aperture portions 541, the bonding layer 54 is to be composed of four parts 54a, 54b, 54c and 54d which are arranged along the outer periphery of the adhesion layer 53. As shown in FIG. 6B, the parts 54a and 54c of the bonding layer 54 are provided along the short sides of the adhesion layer 53, respectively, over the entire lengths of the respective short sides. On the other hand, the parts 54a to 54d of the bonding layer 54 are provided along the long sides of the adhesion layer 54, respectively, with predetermined intervals along the respective long sides. The intervals form the aperture portions 541.

Then, the bonding layer 54 is made of an adhesive having bonding strength in which the bonding strength between the liquid crystal display panel 51 and the protection plate 52 is larger than the bonding strength between the adhesion layer 53 and each of the liquid crystal display panel 51 and the protection plate 52 when the bonding layer 54 is cured. The adhesive is a liquid having liquidity (uncured) at the time of pasting and has resistance to peeling by being cured. As such an adhesive, for example, a heat curing type adhesive, a UV curing type adhesive, and a moisture curing type adhesive can be named. Here, the values of the bonding strength of the adhesion layer 53 or the bonding layer 54 with the adherend and the joining strength between adherends in the present description are those measured in conformity with "Test Method of Peel Strength of Adhesive-Part 3: T-Peeling (K6854-3)" or "Test Method of Cleavage Strength of Adhesive (K6853)" in the Japanese Industrial Standard (JIS) according to the properties of adherends.

Further, when the display apparatus 5 with protecting plate is housed in the case 3 in such a way that the protection plate 52 is arranged in the opening 2 of the case 3 as shown in FIG. 1, the surface light source unit 6 is arranged by being fixed to a supporting section 31 which is provided in the case 3. A plurality of positioning projections 311 coming into contact with the outer peripheral surface of a frame-shaped member 61 of the surface light source unit 6 is provided on the supporting section 31. Then, the frame-shaped member 61 of the surface light source unit 6 is fixed to the positioning projections 311 with fixing devices such as screw fixing.

Furthermore, a sealing frame 40 for preventing dust from entering the case 3 through the gap between the peripheral surface of the opening 2 and the outer peripheral surface of the protection plate 52 is provided between a peripheral wall section 61a of the frame-shaped member 61 of the surface light source unit 6 and the periphery of the opening 2 of the case 3. The sealing frame 40 is made of an elastic material, such as sponge, and is sandwiched between opposite surfaces in the state of being compressed to some extent by sticking one surface of the sealing frame 40 to one of the opposite surfaces between the inner surface of the case 3 and the top surface of the peripheral wall section 61a of the frame-shaped member 61, and by contacting the other surface of the sealing frame 40 to the other one of the opposite surfaces.

Figure 2:
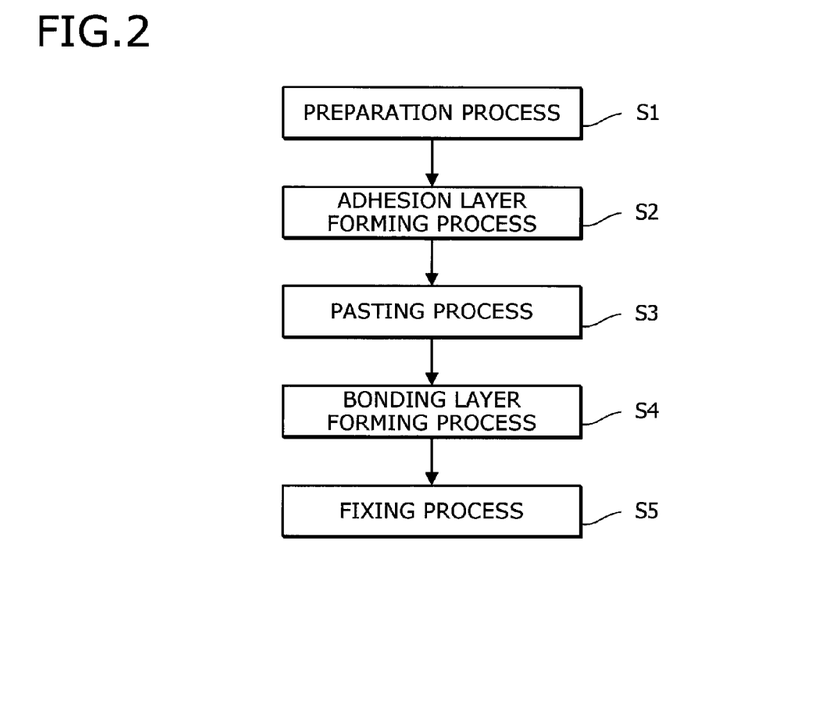
FIG. 2 is a manufacturing process chart showing a flow of a manufacturing method of the display apparatus with protection plate of the embodiment.

Next, manufacturing process of the electronic device 1 will be described with reference to a manufacturing process chart shown in FIG. 2.

Figure 3A:
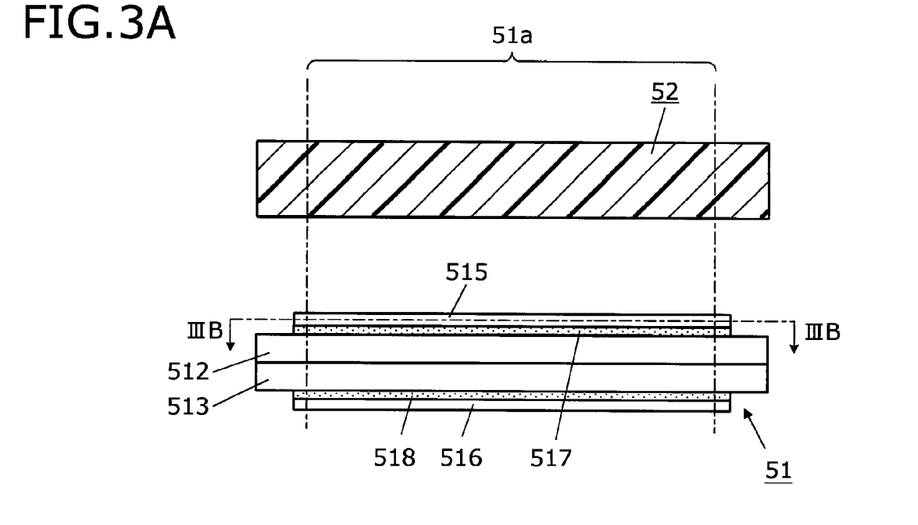
FIG. 3A is a sectional view seen from a cutting line a-a of FIG. 3B and where
Figure 3B:
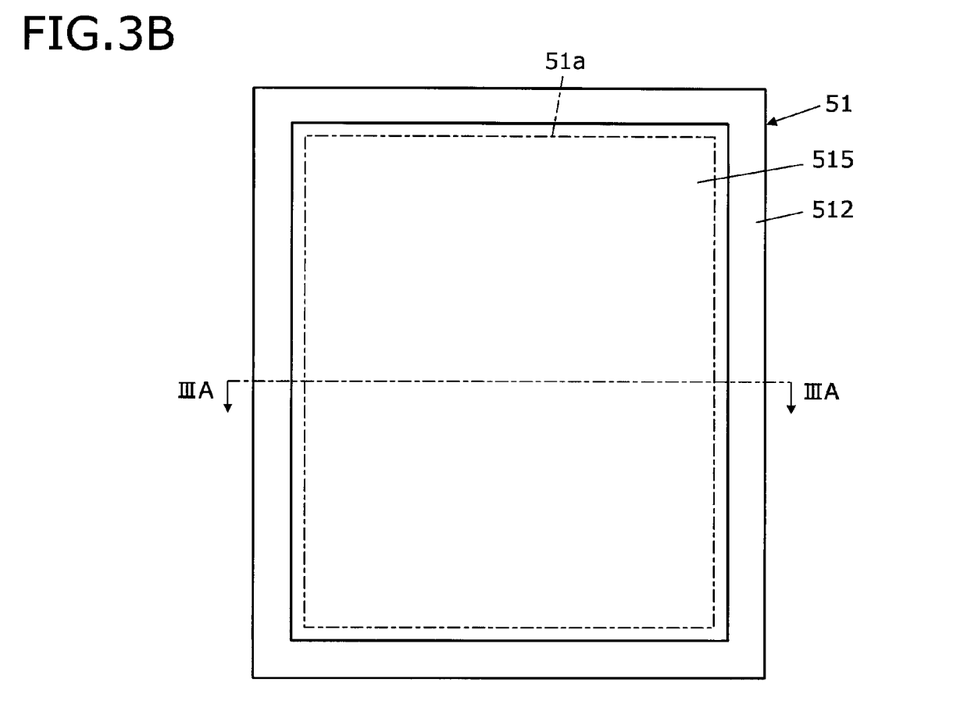
FIG. 3B is a sectional view seen from a cutting line b-b of FIG. 3A.

First, at the time of assembling the display apparatus 5 with protection plate, as shown in FIGS. 3A and 3B, the liquid crystal display panel 51 and the protection plate 52 are prepared (preparation process S1).

Figure 4A:
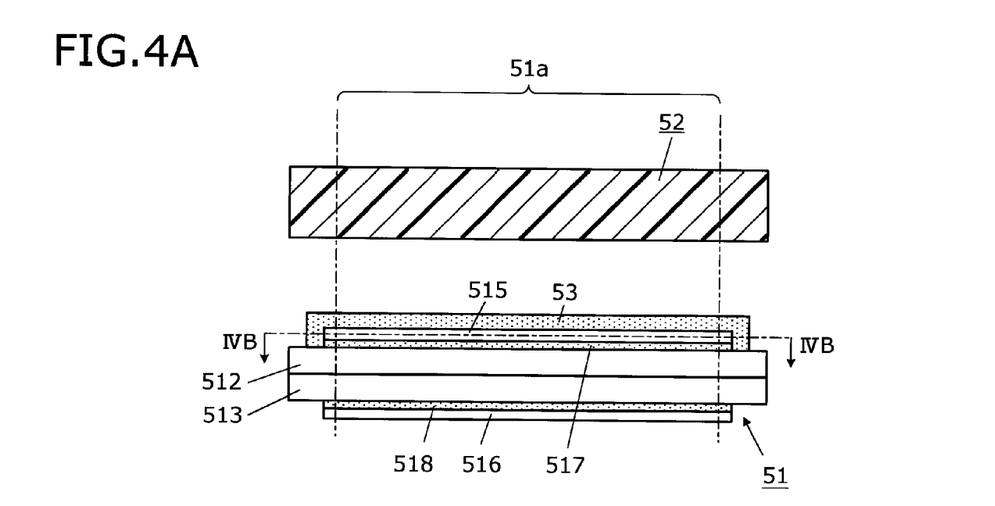
FIG. 4A is a sectional view seen from a cutting line a-a of FIG. 4B and where
Figure 4B:
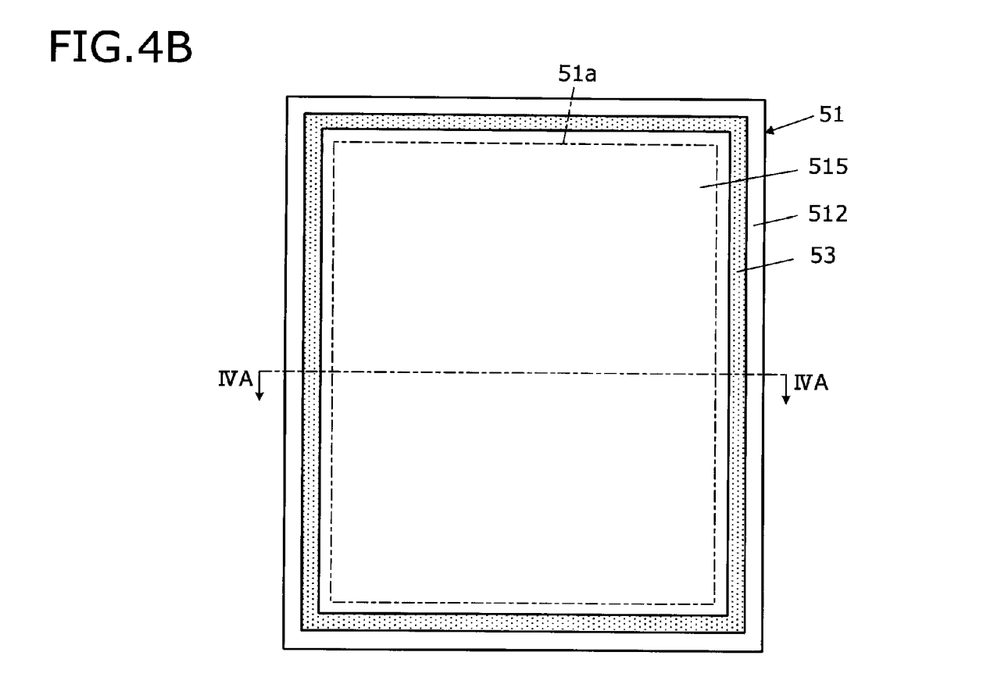
FIG. 4B is a sectional view seen from a cutting line b-b of FIG. 4A.

Next, as shown in FIGS. 4A and 4B, the adhesion layer 53 is formed on the surface of the liquid crystal display panel 51 in the side which is oppositely arranged to the protection plate 52 so as to overlap with the entire screen area 51a of the liquid crystal display panel 51 and the optical sheet 515 (adhesion layer forming process S2). The adhesion layer 53 is formed in a sheet laminated on a release paper before the forming process. The adhesive sheet is attached to an arrangement place and the adhesion layer 53 is formed by peeling the release paper.

Here, the adhesion layer 53 may be arranged on the surface of the protection plate 52 in the side of being oppositely arranged to the liquid crystal display panel 51.

Figure 5A:
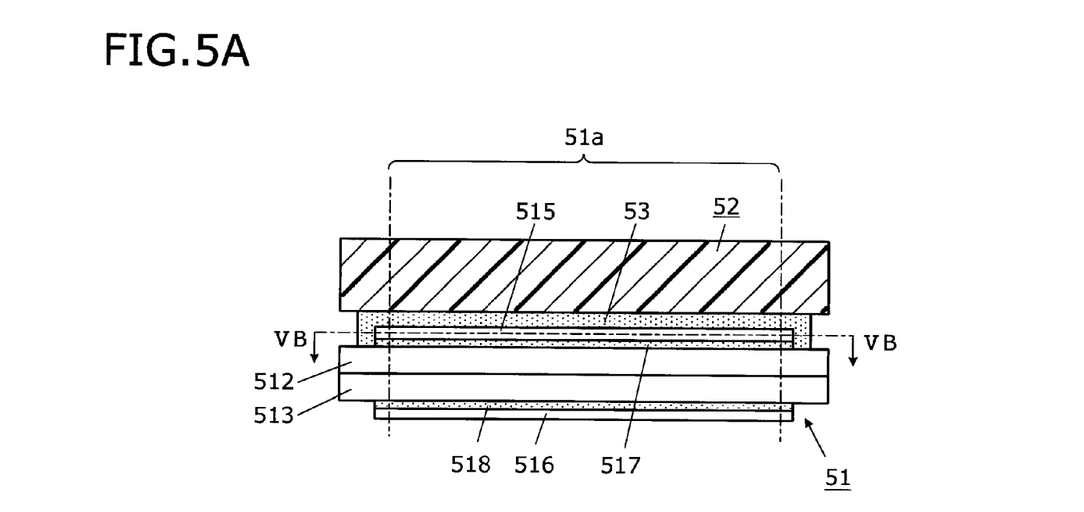
FIG. 5A is a sectional view seen from a cutting line a-a of FIG. 5B and where
Figure 5B:
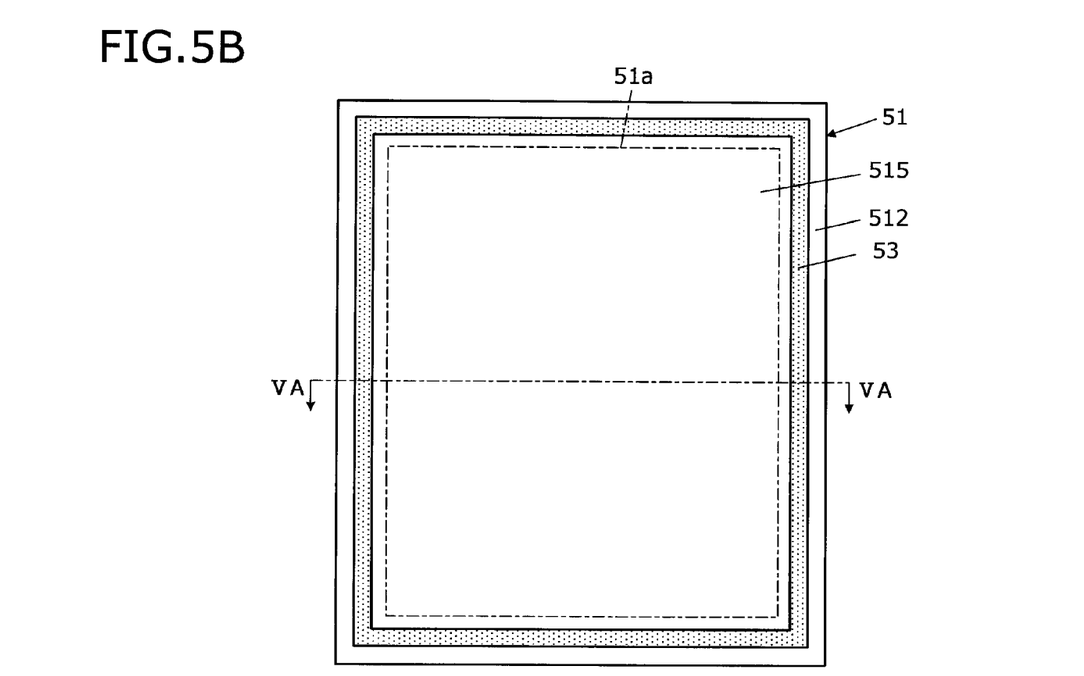
FIG. 5B is a sectional view seen from a cutting line b-b of FIG. 5A.

Next, as shown in FIGS. 5A and 5B, the liquid crystal display panel 51 and the protection plate 52 are pasted together with the adhesion layer 53 intervening therebetween (pasting process S3).

Figure 6A:
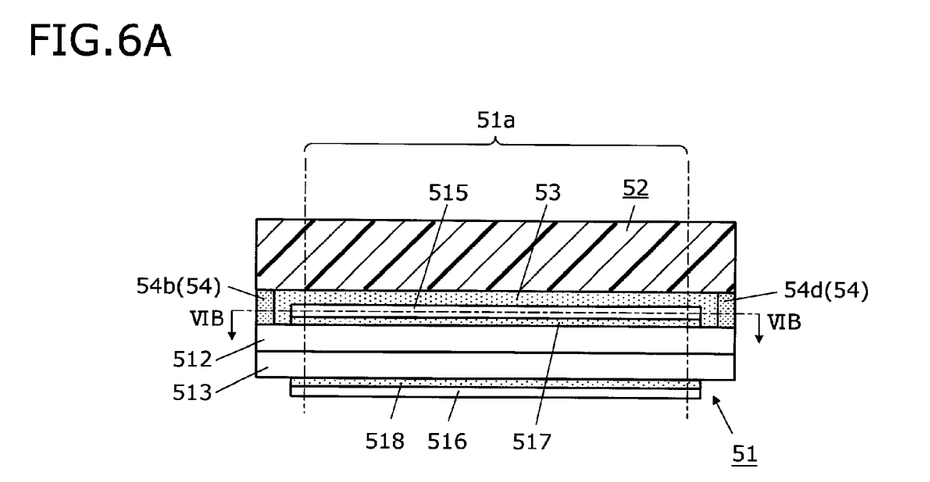
FIG. 6A is a sectional view seen from a cutting line a-a of FIG. 6B and where
Figure 6B:
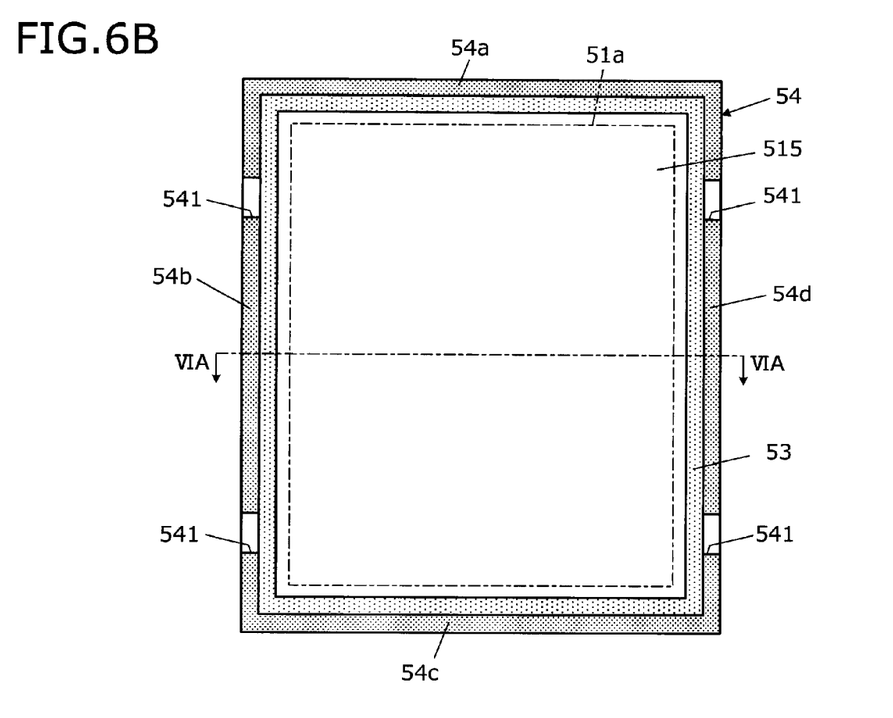
FIG. 6B is a sectional view seen from a cutting line b-b of FIG. 6A.

Next, as shown in FIGS. 6A and 6B, the bonding layer 54 is formed on the circumference of the adhesion layer 53 so as to form the aperture portions 541 (bonding layer forming process S4). The bonding layer 54 is formed by injecting an adhesive into the bonding layer filling region with a well-known dispenser.

Thereafter, by performing the processing suitable for the curing condition of the adhesive, the bonding layer 54 is cured to fix the liquid crystal display panel 51 and the protection plate 52 to each other (fixing process S5). For example, when the bonding layer 54 is a heat curing type adhesive, heating processing is performed; when the bonding layer 54 is a UV curing type adhesive, ultraviolet ray radiating processing is performed; when the bonding layer 54 is a moisture curing type adhesive, humidifying processing is performed.

After the assembly of the display apparatus 5 with protection plate, the display apparatus 5 with protection plate and the surface light source unit 6 are integrated to form the liquid crystal display module 4. In particular, the periphery of the surface of the display apparatus 5 in the back surface side is fixed to the inner bottom part of the surface light source unit 6 with a double-faced adhesive tape 66 to be integrated. Then, the liquid crystal display module 4 is housed in the case 3 in such a way that the protection plate 52 of the liquid crystal display module 4 is arranged in the opening 2 of the case 3. At the time of housing, the sealing frame 40 is made to intervene between the peripheral wall section 61a of the frame-shaped member 61 of the surface light source unit 6 and the periphery of the opening 2 of the case 3. Then, by fixing the frame-shaped member 61 of the surface light source unit 6 to the positioning projections 311 of the case 3, the assembly of the electronic device 1 is completed.

As described above, according to the present embodiment, because most of the liquid crystal display panel 51 and the protection plate 52 are joined together with the adhesion layer 53 having the bonding strength where the bonding strength between the liquid crystal display panel 51 and the protection plate 52 is smaller than the bonding strength between the bonding layer 54 and each of the liquid crystal display panel 51 and the protection plate 52, the joining strength between the liquid crystal display panel 51 and the protection plate 52 can be made to be smaller comparing to the joining strength of the display apparatus where the whole body of the liquid crystal display panel 51 and the protection plate 52 are pasted together with the bonding layer 54. On the other hand, because parts of the liquid crystal display panel 51 and the protection plate 52 are joined together with the bonding layer 54 where the bonding strength between the liquid crystal display panel 51 and the protection plate 52 is larger than the bonding strength between the adhesion layer 53 and each of the liquid crystal display panel 51 and the protection plate 52, the joining strength between the liquid crystal display panel 51 and the protection plate 52 can be made to be larger comparing to the joining strength of the display apparatus where the whole body of the liquid crystal display panel 51 and the protection plate 52 are pasted together with the adhesion layer 53. From the above, in the case where the joining strength between the liquid crystal display panel 51 and the protection plate 52 is too weak when only the adhesion layer 53 is used at the time of use and the joining strength is too strong when only the bonding layer 54 is used at the time of manufacture, it is possible to provide a display apparatus with a protection plate capable of setting the joining strength between the liquid crystal display panel and the protection plate to the joining strength which is between the joining strength in the case where only the adhesion layer 53 intervenes between the liquid crystal display panel and the protection plate and the joining strength in the case where only the bonding layer 54 intervenes between them by pasting the liquid crystal display panel 51 and the protection plate 52 to each other with the adhesion layer 53 and the bonding layer 54. Then, by setting the joining strength suitably, it is possible to provide the display apparatus with protection plate capable of fixing the liquid crystal display panel 51 and the protection plate 52 to each other firmly so that they will not be easily separated at the time of use and capable of tearing off the liquid crystal display panel 51 and the protection plate 52 from each other as the occasion demands at the time of manufacture, and a manufacturing method thereof.

Further, the aperture portions 541 making the region in one side on which the screen area 51a of the liquid crystal display panel 51 is arranged with respect to the bonding layer 54 and the region in the other side opposite to the one side with respect to the bonding layer 54 communicate with each other are provided, and the joining strength between the liquid crystal display panel 51 and the protection plate 52 is lowered at the aperture portions 541 comparing to that in the parts other than the aperture portions 541. Hence, the liquid crystal display panel 51 and the protection plate 52 are firmly fixed to each other so that they will not be easily separated at the parts other than the aperture portions 541 at the time of use and the liquid crystal display panel 51 and the protection plate 52 can easily be torn off by using the aperture portions 541 as the starting points as the occasion demands at the time of manufacture. Furthermore, by changing the sizes of the aperture portions 541, the joining strength can be changed. Moreover, by the existence of the aperture portions 541, it is also possible to prevent the deformation (contraction) of the adhesion layer 53 from being prevented.

Further, because the bonding layer 54 is composed of the plurality of parts 54a, 54b, 54c and 54d which are arranged along the outer periphery of the adhesion layer 53, the gaps between the plurality of parts 54a, 54b, 54c and 54d can be used as the aperture portions 541 and hereby, a plurality of aperture portions 541 can be formed. When the bonding layer 54 having the length corresponding to a half of the length of the outer periphery of the adhesion layer 53 is formed along the adhesion layer 53 with constant widths, the existence of the plurality of aperture portions 541 makes it possible not to form the bonding layer 54 only in the right side half of the adhesion layer 53 or the left side half thereof, but to divide the bonding layer 54 into a plurality of parts to form each part of the bonding layer 54 in both the right side half and the left side half in such a way that at least one part of the bonding layer 54 is formed in each of the right and left side halves. Consequently, bias of the joining strength between the liquid crystal display panel 51 and the protection plate 52 can be made to be less.

Furthermore, because the bonding layer 54 is provided along a bonding layer provided side which is at least one of the sides of the rectangular adhesion layer 53 over the whole length of the bonding layer provided side, no aperture portions 541 exist in this bonding layer provided side. Namely, the joining strength in this side does not decrease because of the aperture portions 541, and the joining strength in the side can be kept to be large.

Here, the present invention is not limited to the embodiment described above, and can be suitably changed.

For example, although the liquid crystal display panel 51 is exemplified to be described as the display panel in the present embodiment, the display panel may be any one as long as the display panel has a transparent substrate. As other display panels, an organic electroluminescence (EL) display panel and electronic paper can be named.

Furthermore, the joining strength between the protection plate 52 and the optical sheet 515 via the adhesion layer 53 is preferably smaller than the joining strength between the transparent substrate 512 and the optical sheet 515 via the adhesive compound 517 for an optical sheet. Hereby, it can be prevented that the optical sheet 515 is peeled off together with the protection plate 52 when the liquid crystal display panel 51 and the protection plate 52 are peeled off from each other.

Moreover, by providing the bonding layer 54 in a region next to the rectangular adhesion layer 53 except for a region next to at least one corner part of the rectangular adhesion layer 53 and by providing the aperture portion 541 in the region next to the corner part of the rectangular adhesion layer 53, the liquid crystal display panel 51 and the protection plate 52 can easily be torn off by using the corner part as the starting point as the occasion demands at the time of manufacture of the display apparatus with protection plate. Further, the aperture portion 541 is provided in the region next to at least one corner part of the rectangular adhesion layer 53 and also, at least a part of the bonding layer 54 may be provided along a bonding layer provided side which is one of the sides of the rectangular adhesion layer 53 over the whole length of the bonding layer provided side. Furthermore, at least a part of the bonding layer 54 may be provided along a predetermined part of the bonding layer provided side of the rectangular adhesion layer 53, and the residual parts of the bonding layer provided side except for the predetermined part may be provided as the aperture portions 541.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manufacturing method of a display apparatus with a protection plate, comprising:
    preparing a display panel having a transparent substrate and a protection plate which is fixed to the display panel;
    forming an adhesion layer for pasting the display panel and the protection plate together so as to superpose the adhesion layer on an entire screen area of the display panel, the adhesion layer being formed on either a surface of the display panel on a side arranged to be opposed to the protection plate or a surface of the protection plate on a side arranged to be opposed to the display panel;
    pasting the display panel and the protection plate together with the adhesion layer intervening therebetween;
    forming a bonding layer by making an uncured bonding layer directly contact each of both of the display panel and the protection plate so as to form an aperture at a circumference of the adhesion layer to enable a region on one side of on which the screen area of the display panel is arranged with respect to an outer periphery of the adhesion layer and a region on the other side opposite to the one side with respect to the outer periphery of the adhesion layer to communicate with each other; and
    fixing the display panel and the protection plate to each other by curing the uncured bonding layer.

2. The manufacturing method of the display apparatus with the protection plate according to claim 1, wherein bonding strength between the cured bonding layer and each of the display panel and the protection plate is larger than bonding strength between the adhesion layer and each of the display panel and the protection plate.

* * * * *